United States Patent
Dye et al.

(10) Patent No.: US 10,239,130 B1
(45) Date of Patent: Mar. 26, 2019

(54) GUIDE DEVICE FOR A CUTTING TOOL

(71) Applicant: James Hardie Technology Limited, Dublin (IE)

(72) Inventors: Thayne Dye, Upland, CA (US); James Bond, Moreno Valley, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 15/820,915

(22) Filed: Nov. 22, 2017

Related U.S. Application Data

(60) Provisional application No. 62/425,490, filed on Nov. 22, 2016.

(51) Int. Cl.
*B23B 47/28* (2006.01)
*B23B 51/00* (2006.01)
*B23B 49/02* (2006.01)

(52) U.S. Cl.
CPC .......... *B23B 51/0054* (2013.01); *B23B 47/28* (2013.01); *B23B 49/023* (2013.01); *B23B 2247/12* (2013.01); *B23B 2270/34* (2013.01)

(58) Field of Classification Search
CPC ....... B23B 47/28; B23B 47/287; B23B 49/02; B23B 49/023
See application file for complete search history.

(56) References Cited

U.S. PATENT DOCUMENTS

| | | | | |
|---|---|---|---|---|
| 36,903 A | * | 11/1862 | Hadley | B23B 51/104 408/112 |
| 1,160,267 A | * | 11/1915 | Davis | B23B 47/28 408/72 R |
| 1,831,813 A | * | 11/1931 | Levedahl | B23B 49/02 408/112 |
| 2,494,229 A | * | 1/1950 | Collison | A61B 17/1728 408/1 R |
| 2,669,889 A | * | 2/1954 | Huller | B23B 47/34 408/17 |
| 2,792,726 A | * | 5/1957 | Vick | B23B 49/02 408/112 |
| D264,930 S | * | 6/1982 | Lindsay | D8/70 |
| 4,388,921 A | * | 6/1983 | Sutter | A61B 17/8047 411/537 |
| 4,969,781 A | * | 11/1990 | Fahrner | B23B 47/28 408/112 |
| 5,108,241 A | * | 4/1992 | Coss | B23B 47/34 408/115 B |
| 5,126,908 A | * | 6/1992 | Casari | G11B 15/07 360/137 |
| 5,630,683 A | * | 5/1997 | Smith | B23B 47/34 408/241 B |
| 6,109,839 A | * | 8/2000 | Thomas | B23B 49/02 33/562 |

FOREIGN PATENT DOCUMENTS

DE 545524 C * 3/1932 ........... B23B 51/108

* cited by examiner

*Primary Examiner* — Daniel W Howell
(74) *Attorney, Agent, or Firm* — Knobbe Martens Olson & Bear, LLP

(57) ABSTRACT

A guide device comprising a hollow body configured to receive a drill bit, the hollow body having a first end; a second end; and a continuous section intermediate the first end and the second end; an opening extending from the first end through the continuous section to the second end; and at least one aperture located on the hollow body intermediate the first and second end of the hollow body.

13 Claims, 8 Drawing Sheets

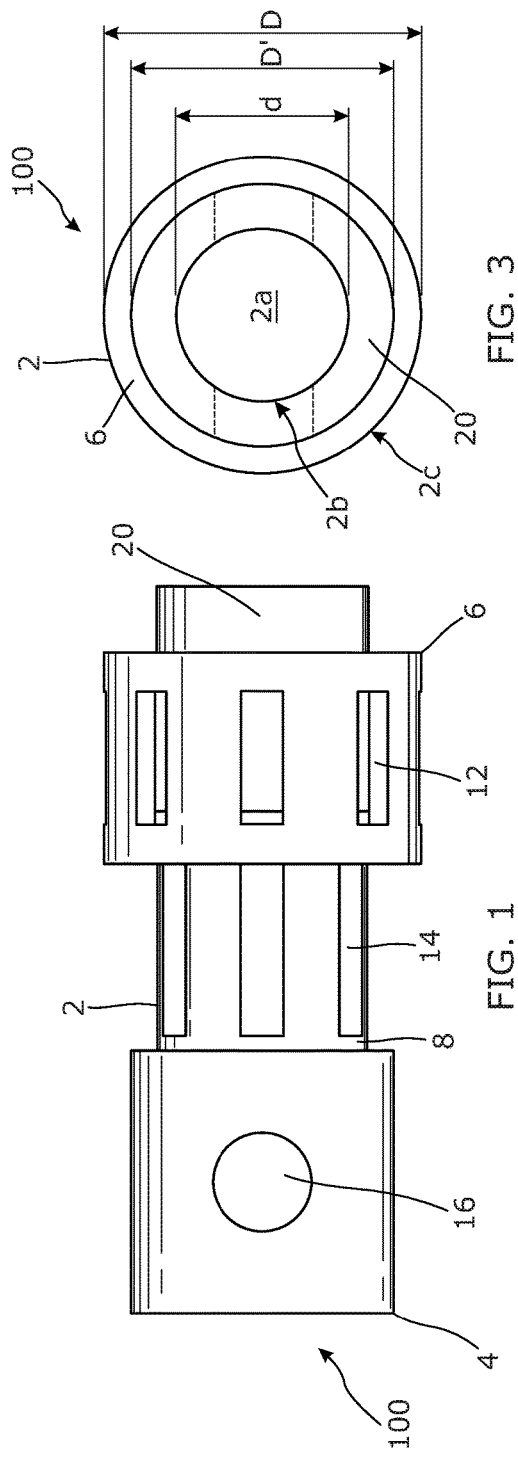
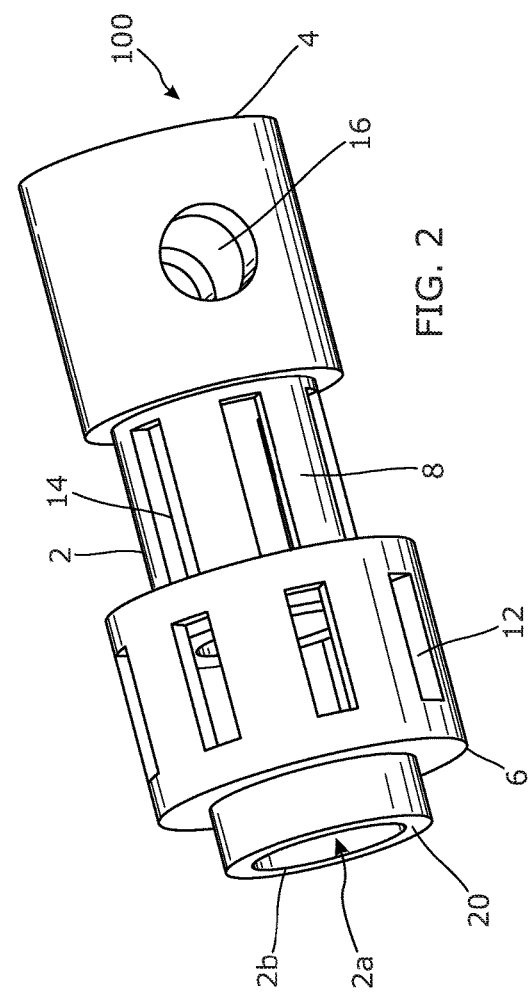

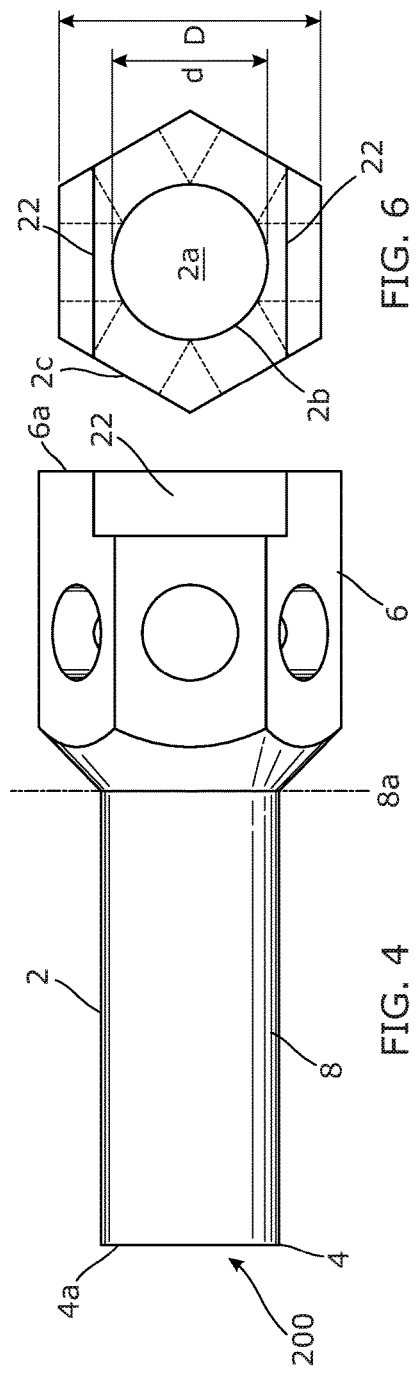
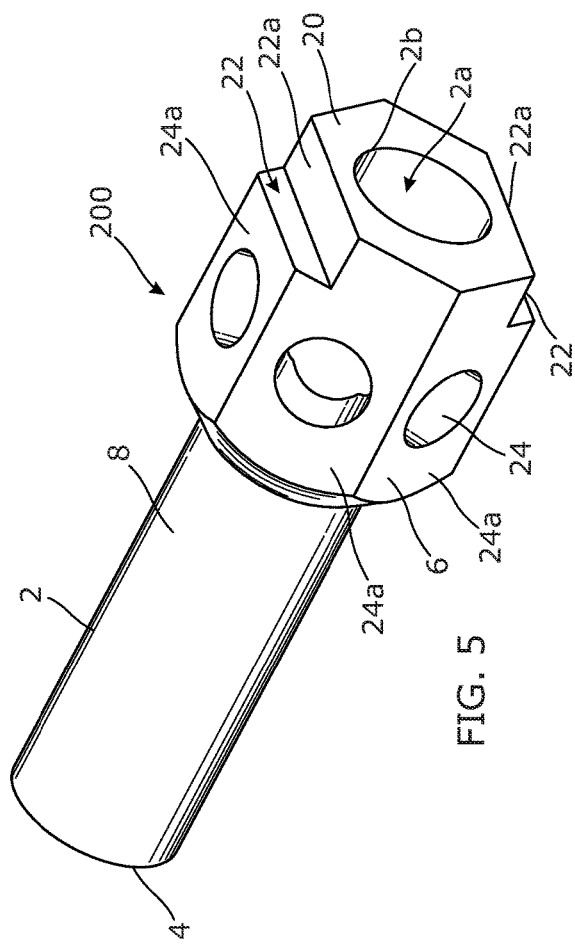
FIG. 4
FIG. 6
FIG. 5

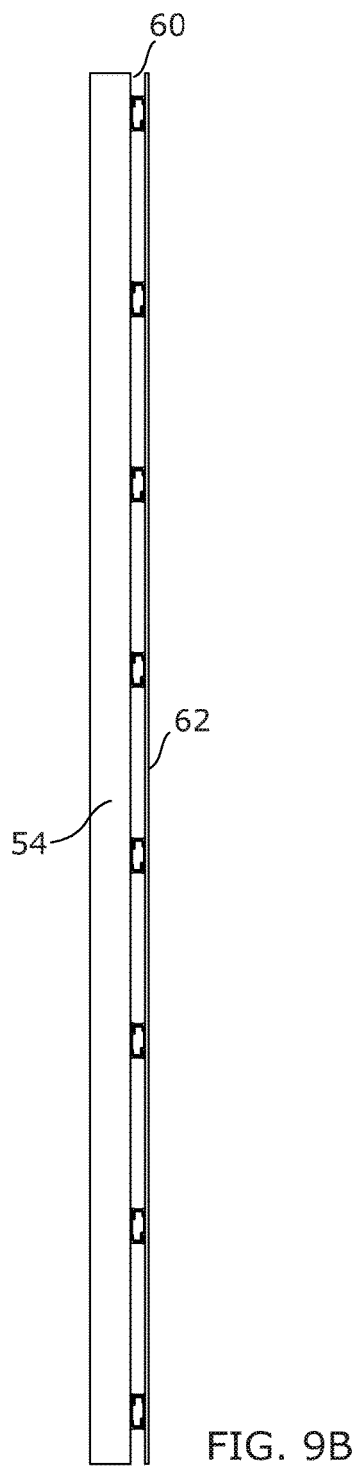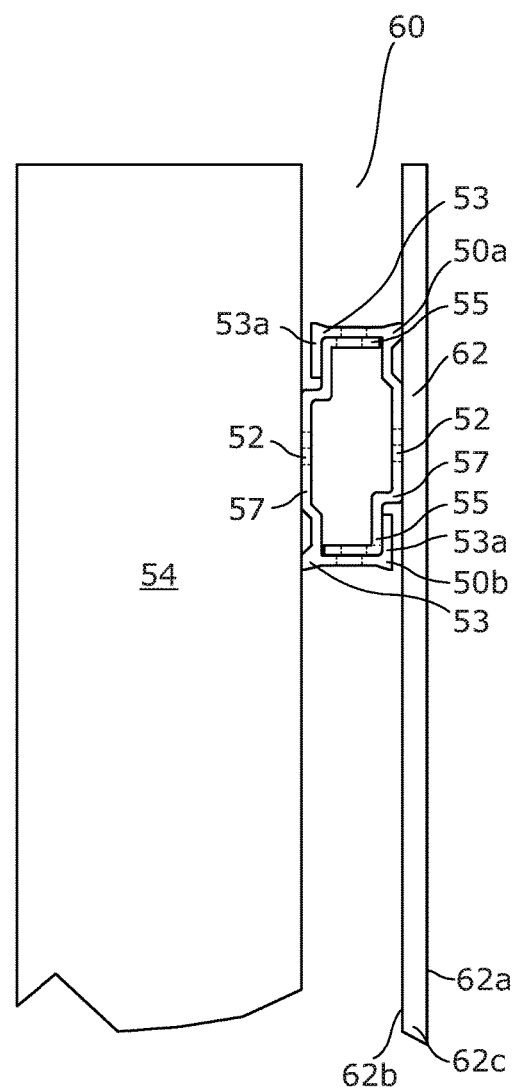
FIG. 9B
FIG. 9C

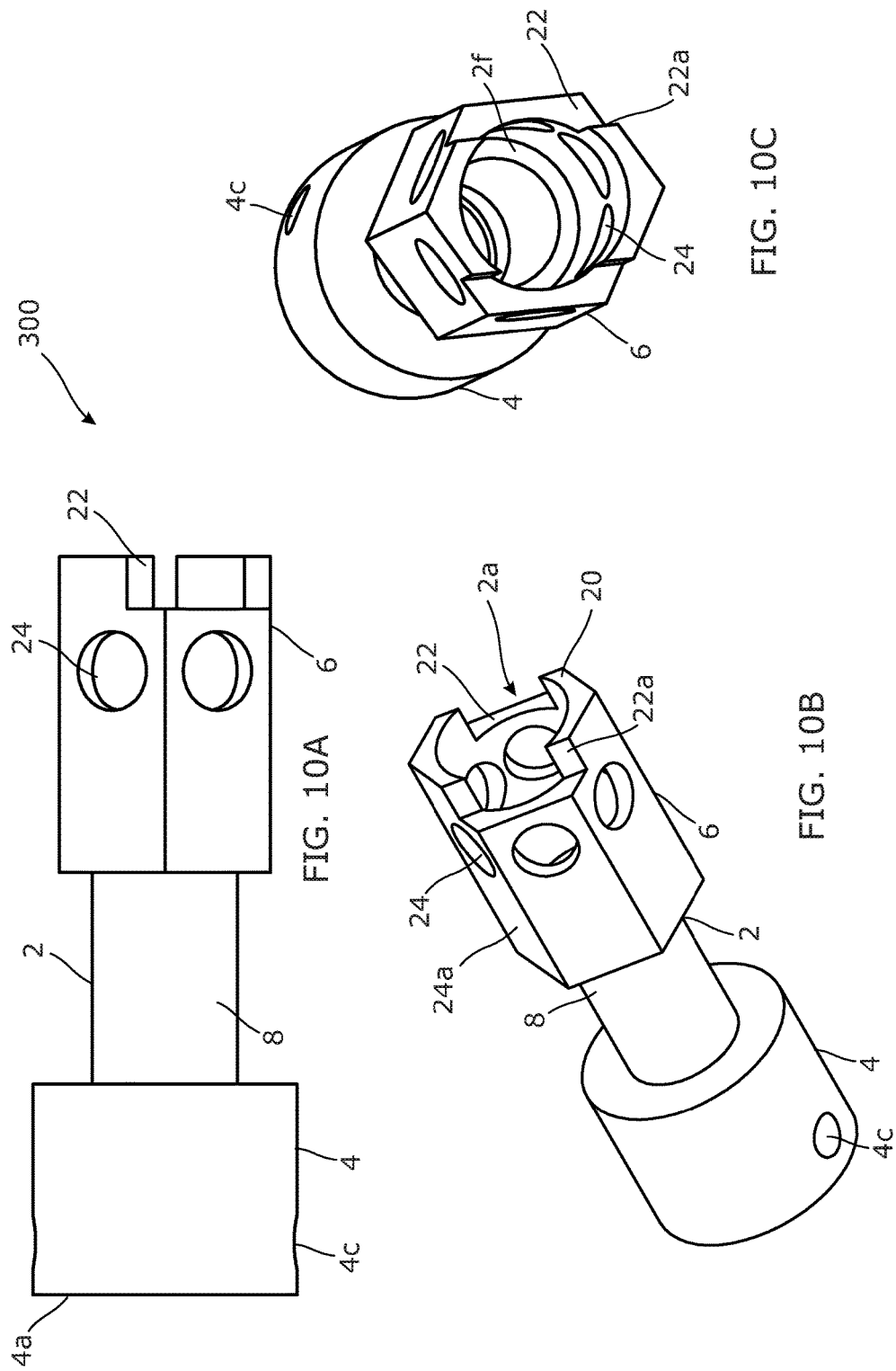

GUIDE DEVICE FOR A CUTTING TOOL

CROSS-REFERENCE TO RELATED APPLICATIONS

This application claims the benefit of U.S. Provisional Application Ser. No. 62/425,490, filed Nov. 22, 2016, entitled "GUIDE DEVICE FOR A CUTTING TOOL," which is hereby incorporated by reference in its entirety and for all purposes.

BACKGROUND

Field

The present disclosure generally relates to a guide device suitable for use with a cutting tool, in particular a drill bit.

Description of the Related Art

Any discussion of the prior art throughout the specification should in no way be considered as an admission that such prior art is widely known or forms part of the common general knowledge in the field.

Power tools such as drills are commonly used in the construction industry to create holes in many different materials. A drill typically comprises a motor driven rotating rod-shaped tool, more commonly referred to as a drill bit. In use, a drill bit cuts or bores into the material being drilled to create a hole as desired. Typically, drill bits come in many different shapes and sizes, however most drill bits have two main features, a sharpened or tapered end that cuts into the material and a spiral screw thread or auger that lifts the material up out of the hole being created, thus removing the material from the hole.

SUMMARY

It may be desirable to provide a guide device which allows a user to create a hole in a material wherein each hole created by the user is in the correct position on the material, is of the desired size, and/or achieves the desired depth in the material.

Accordingly, there is provided in various embodiments a guide device suitable for use with a drill bit, wherein the guide device is designed to facilitate creation of holes in a material at a user determinable position, of a user determinable size, and/or of a user determinable depth.

In one embodiment, the guide device comprises a hollow body configured to receive a drill bit, the hollow body having a first end; a second end; and a continuous section intermediate the first end and the second end; an opening extending from the first end through the continuous section to the second end; and at least one aperture located on the hollow body intermediate the first and second end of the hollow body.

One advantage of certain embodiments of the guide device is that the configuration of the guide device is such that, when a drill bit is positioned within the opening of the hollow body, it is coaxially located with the hollow body. In addition, the sharpened or tapered end of the drill bit is orthogonally located relative to a material being drilled. The guide device can allow a drill bit to freely rotate about the fixed rotational axis of the drill to create a hole, whilst preventing free lateral movement around the hole being drilled. In this way a user is able to form a hole in a material which is in the correct location.

For the purposes of this specification, the term 'comprise' shall have an inclusive meaning. Thus it is understood that it should be taken to mean an inclusion of not only the listed components it directly references, but also non specified components. Accordingly, the term 'comprise' is to be attributable with as broad an interpretation as possible and this rationale should also be used when the terms 'comprised' and/or 'comprising' are used.

Further aspects or embodiments of the present disclosure will become apparent from the ensuing description which is given by way of example only.

In one embodiment, a guide device comprises a first end section and a second end section. The first end section comprises an exterior surface, an interior surface, and a drill bit securing aperture extending between the interior surface and the exterior surface. The interior surface defines an opening extending through the first end section along a central axis, the opening being sized and shaped to receive a drill bit therethrough. The drill bit surface aperture extends perpendicular to the central axis, the drill bit securing aperture being sized and shaped to receive a mechanical fastener for securing the first end section to the drill bit. The second end section comprises a hollow body having an opening extending therethrough along the central axis, the opening being sized and shaped to receive the drill bit therethrough. The second end further comprises a plurality of apertures extending perpendicular to the central axis, the plurality of apertures distributed radially about the second end section to accommodate the passage of debris therethrough. The second end section is slidably and rotatably coupled to the first end section such that the second end section can remain stationary relative to a substrate being drilled while the first end section is rotated by a rotating drill bit secured thereto.

In another embodiment, a guide device comprises a hollow body having a first end, a second end, and a continuous section intermediate the first end and the second end. The guide device further comprises an opening extending along a central axis from the first end through the continuous section to the second end, the opening configured to receive a drill bit therethrough, and at least one aperture located on the hollow body intermediate the first and second end of the hollow body, the aperture being contiguous with the opening and extending perpendicular to the central axis to accommodate the passage of debris therethrough.

In one embodiment, the guide device is configured such that the guide device acts as a stop mechanism for a drill bit. Accordingly, in one embodiment, the length of the guide device between the first and second end corresponds to the length of a drill bit extending from a drill less the depth of a hole to be created by the drill bit. In one embodiment the length of the guide device between the first end and the second end is between 1.38" (cm) and 1.5" (3.81 cm). In use, the length of the guide device is such that the guide device will come into contact with the drill when the drill bit has drilled a hole of the desired depth in the material thereby preventing the drill bit from drilling further into the material. In this way a user is able to form a hole in a material which is of the correct depth.

In a further embodiment, the first end of the hollow body is configured to abut a drill such that the guide device acts as a bearing for the drill. In one embodiment, the first end of the hollow body is sized and shaped to abut a chuck portion of a drill such that the chuck portion of the drill is able to rest against the first end of the hollow body and the drill bit is able to freely rotate within the hollow body about the fixed rotational axis of the drill. It is understood that the first end of the hollow body could also be similarly configured to abut a drill bit collar. The guide device and drill or drill bit collar operate synergistically with the drill to allow free rotation of a drill bit about the fixed rotational axis of the drill whilst preventing a drill bit from extending beyond the desired depth into the material being drilled.

In a further embodiment, the one or more apertures located on the hollow body intermediate the first and second end of the hollow body, provide openings through which material can be expelled from the guide device. The size and shape of the one or more apertures are variable. The advantage of this is that the material is removed from the guide device as the spiral screw thread or auger of the drill bit lifts the material up out of the hole being created. This prevents a drill bit from becoming blocked or prevented from rotating during use within the guide device. The one or more apertures further comprise a heat sink wherein the one or more apertures are configured to dissipate any heat generated by the drill bit whilst rotating within the guide device. In one embodiment, the one or more apertures are circular apertures and have a diameter between approximately 0.08" (0.2 cm) and 0.18" (0.48 cm). In a further embodiment, the one or more apertures are rectangular apertures and have a width between approximately 0.0625" (0.16 cm) and 0.15625" (0.4 cm).

In one embodiment, the one or more apertures are located proximal the second end of the hollow body. In a further embodiment, the one or more apertures comprise up to approximately 40%, 50%, 60%, or more, of the area of the second end of the hollow body. In one embodiment, the one or more apertures comprise between 45% and 55% of the area of the second end of the hollow body.

In one embodiment, the guide device further comprises a locating section. In one embodiment the locating section is integrally formed on the hollow body of the guide device. In a further embodiment the locating section is integrally formed at the second end of the hollow body of the guide device. The locating section provides a means by which a user can easily seat the guide device at a desired location on a material in which it is desired to create a hole.

In a further embodiment, the guide device is suitable for use with one or more fastening systems comprising profiles, rails or tracks. An example of such a fastening system is disclosed in U.S. Patent Application Ser. No. 62/309,607, which is incorporated by reference herein in its entirety. A fastening system may comprise a first and second profile member wherein the first and second profile member are configured to attach to either a cladding panel or structural substrate. In one embodiment, each of the first and second profile member of the fastening system comprises one or more fixing apertures. The fixing apertures are configured to enable each of the first and second panel support profile members to attach to either a cladding panel or a structural substrate as desired by the user.

In use, the locating section allows the user to seat the guide device quickly and easily within the one or more fixing apertures of the fastening system.

In the instance where there are a plurality of fixing apertures in the fastening system, the user can easily move the guide device from one fixing aperture to the next and create holes that are in the desired position and are of consistent size and depth. The guide device enhances efficiencies for a user desiring to drill one or more holes to the desired size and depth in either of the cladding panel or structural substrate at a position suitable for locating the first and/or second profile member on the cladding panel or structural substrate.

The present application also provides a method of installing a fastening system comprising the steps of:

obtaining a support profile of the fastening system, the support profile comprising a planar section having a plurality of fixing apertures extending therethrough;

obtaining a substrate to be fixed to the support profile;

positioning the support profile adjacent to the substrate such that the planar section abuts the substrate;

placing a locating section of a drill bit guide device into one of the plurality of fixing apertures, the drill bit guide device comprising:

a hollow body having a first end, a second end, and a continuous section intermediate the first end and the second end;

the locating section sized and shaped to fit within the fixing aperture;

an opening extending along a central axis from the first end through the continuous section to the second end, the opening configured to receive a drill bit therethrough; and at least one aperture located on the hollow body intermediate the first and second end of the hollow body, the aperture being contiguous with the opening and extending perpendicular to the central axis to accommodate the passage of debris therethrough;

inserting a drill bit through the opening such that a tip of the drill bit contacts the substrate; and rotating the drill bit to drill a hole in the substrate.

In one embodiment, the method further comprises removing the drill bit and the drill bit guide device, and placing a mechanical fastener through the fixing aperture of the support profile into the hole in the substrate such that the mechanical fastener fixes the support profile to the substrate.

In another embodiment, the hollow body of the drill bit guide device has a length selected such that the first end of the drill bit guide device comes into contact with a structure of a drill driving the drill bit when the hole in the substrate reaches a predetermined depth.

BRIEF DESCRIPTION OF THE DRAWINGS

Certain embodiments of the present disclosure will now be described, by way of example only, with reference to the accompanying drawings. From figure to figure, the same or similar reference numerals are used to designate similar components of an illustrated embodiment.

FIG. 1 shows a side view of an embodiment of a guide device.

FIG. 2 shows a perspective view of the guide device of FIG. 1.

FIG. 3 shows an end view of the guide device of FIG. 1.

FIG. 4 shows a side view of a further embodiment of a guide device.

FIG. 5 shows a perspective view of the guide device of FIG. 4.

FIG. 6 shows an end view of the guide device of FIG. 4.

FIG. 9B is a side view of the façade panel, fastening system, and frame structure of FIG. 9A.

FIG. 9C is an enlarged side view of a portion of the façade panel, fastening system, and frame structure of FIG. 9B.

FIG. 10A shows a side view of an embodiment of a guide device.

FIG. 10B shows a side perspective view of the embodiment of FIG. 10A.

FIG. 10C shows an end perspective view of the embodiment of FIGS. 10A and 10B.

DETAILED DESCRIPTION

Figure 7:
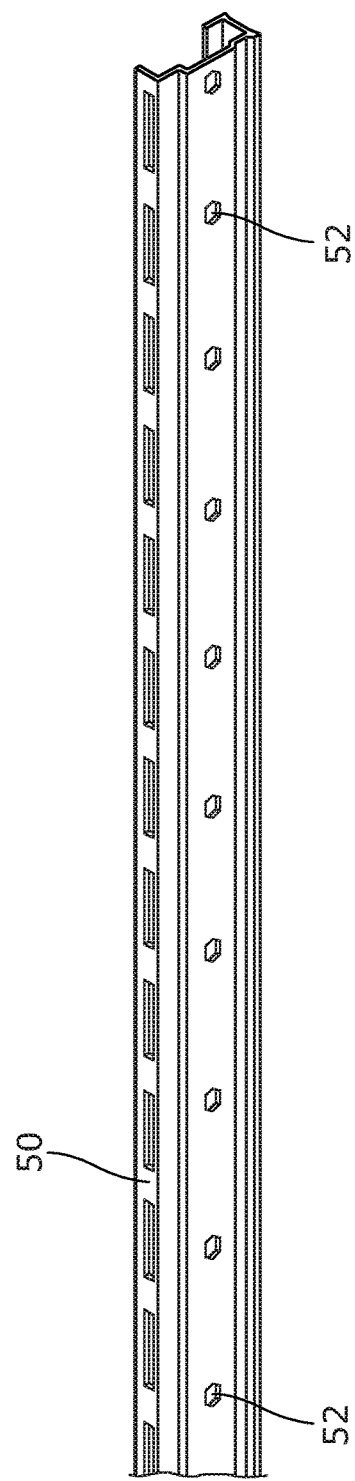
FIG. 7 shows a rear perspective view of an exemplary profile of a fastening system.

Referring now to the drawings and specifically to FIGS. 1 to 6 and 10A-10D, there are shown guide devices 100, 200, and 300, all of which are suitable for use with a drill bit.

Each of guide devices 100, 200, and 300 comprise a hollow body 2 having a first end 4, a second end 6 and a continuous section 8 intermediate the first end 4 and the second end 6. An opening 2a extends from the first end 4 through the continuous section 8 to the second end 6. The hollow body 2 is generally defined by an inner wall 2b bounding the opening 2a, and an outer wall 2c. In each of guide devices 100, 200, the cross sectional internal diameter d of opening 2a bound by inner wall 2b is constant from the first end 4 of hollow body 2 to the second end 6 of hollow body 2. In the guide device 300, the cross sectional internal diameter may vary along the length of the device, as shown in FIG. 10C. In some embodiments, guide device 100 comprises a cross sectional internal diameter d of approximately 0.3" (0.76 cm). In some embodiments, guide device 200 comprises a cross sectional internal diameter d of approximately 0.28" (0.71 cm). In some embodiments, a guide device 100, 200 comprises a cross sectional internal diameter d between approximately 0.28" (0.71 cm) and 0.3" (0.76 cm). In various embodiments, the cross sectional internal diameter d can be any other size depending on the diameter of drill bits to be used with the guide devices 100, 200. For example, where a hole is to be drilled with a 9/32" (0.28125") drill bit, a suitable internal diameter d may be between 0.282" and 0.3". Preferably, the internal diameter d is slightly larger than the diameter of the drill but, but small enough to prevent significant movement of the drill bit laterally (e.g., by translation) and/or radially (e.g., by tilting) away from the central axis of the hollow body 2.

Referring specifically to guide device 100, FIGS. 1 to 3, the cross sectional external diameter D of opening 2a bound by outer wall 2c is variable from the first end 4 of hollow body 2 to the second end 6 of hollow body 2. Conveniently, this provides thinner and thicker portions along the external walls 2c of hollow body 2 to enable a user to easily grip and manipulate guide device 100 into a desired position. In some embodiments, guide device 100 comprises a cross sectional external diameter D that ranges between approximately 0.4" (1.02 cm) and 0.6" (1.52 cm). In certain embodiments, the cross sectional external diameter D may include portions larger and/or smaller than the range of between 0.4" and 0.6", for example, based on considerations such as a size of a drill bit to be used with the guide device 100, ergonomic considerations, or the like.

Guide device 100 is provided with a first end 4 and second end 6 having a greater cross-sectional external diameter D than that of continuous section 8. In some embodiments, the cross sectional external diameter D for guide device 100 is approximately 0.5" (1.27 cm) for a length of approximately 0.5" (1.27 cm) at first end 4 of hollow body 2, approximately 0.4" (1.02 cm) for a length of approximately 0.35" (0.89 cm) at continuous section 8 of hollow body 2, and approximately 0.6" (1.52 cm) for a length of approximately 0.4" (1.02 cm) at second end 6 of hollow body 2. The cross-sectional external diameter D may be determined based on the desired cross-sectional internal diameter d such that a structurally robust wall thickness is maintained. Moreover, the relative lengths of the first end 4, second end 6, and continuous section 8 may be varied, for example, to provide a structurally robust guide device 100, to accommodate a desired configuration of apertures, etc.

In use, a drill bit 32 (FIG. 8) is positioned within the opening 2a of the hollow body 2 such that the drill bit extends through the opening 2a from the first end 4 to the second end 6 and is coaxially or substantially coaxially located with the hollow body 2 of the guide device 100 and 200, and orthogonally located relative to a material or substrate being drilled. Guide device 100 and 200 can thereby allow a drill bit to freely rotate about the fixed rotational axis of the drill to create a hole, whilst preventing free lateral or tilting movement around the hole being drilled. In this way, the guide device 100 and 200 allows a user to control the position and size of the hole being created by the drill.

Drill bits may be designed such that each drill bit comprises a sharpened or tapered end that cuts a hole in a material and a spiral screw thread or auger that lifts the material up out of the hole and out of the material. In the embodiment shown in FIGS. 1 to 3, guide device 100 is further provided with a plurality of apertures 12, 14 and 16 located spaced apart on the hollow body 2 of guide device 100. Apertures 12, 14 and 16 extend through the hollow body 2 from the inner wall 2b to the outer wall 2c such that the space within opening 2a is in communication with the exterior space surrounding the guide device 100. Apertures 12, 14 and 16 may be perpendicular to the central axis of the opening 2a or may extend at an angle smaller than 90 degrees relative to the central axis of the opening 2a. Apertures 12, 14 and 16 may be sized and shaped to facilitate ejection of dust and waste material from guide device 100. Thus, dust and waste material being carried away from the material being drilled by the auger may pass radially out of the hollow body by passing from the space within opening 2a, through the inner wall 2b and outer wall 2c at an aperture 12, 14, 16, to the exterior space surrounding the guide device 100. In some embodiments, the apertures 12, 14, and 16 may advantageously prevent clogging that may occur if all dust and waste material were carried through the length of the guide device 100 by the auger portion of the drill bit.

In some embodiments, each of apertures 12 and 14 are approximately 0.08" (0.2 cm) in width. In various embodiments, the apertures 12 and 14 may have a width between approximately 0.05" and 1.2". Each of apertures 12 and 14 may be regularly spaced apart on the circumferential body of guide device 100 at the second end 6 of hollow body 2 and continuous section 8 of hollow body 2 respectively. Apertures 12 situated proximal to second end 6 of hollow body 2 may be more numerous than either of apertures 14 or 16 to facilitate ejection of dust closer to the sharpened or tapered end of the drill bit. This may prevent dust build-up inside the guide device 100, which may cause the drill bit to slow down or become blocked whilst in use.

Apertures 12, 14 and 16 may further act as a heat sink to dissipate any heat generated by the drill bit whilst rotating within the guide device 100. For example, heat may be generated due to friction such as between the drill bit and the material being drilled, and/or between the drill bit and the interior wall 2*b* of the hollow body 2. Accordingly, heated particles and/or air contained within the opening 2*a* may be allowed to move outward and away from the drill bit through apertures 12, 14, 16.

Guide device 100 may further comprise a locating section 20. Locating section 20 is provided to assist a user to position the guide device 100 correctly and easily on a material being drilled. In some embodiments, locating section 20 comprises a hollow cylindrical section integrally formed at the second end 6 of guide device 100 remote continuous section 8. The internal diameter of locating section 20 corresponds to diameter d bound by inner wall 2*b* of hollow body. In some embodiments and as shown in FIGS. 1 to 3, the width or external diameter D' of locating section 20 is reduced relative to largest extent or fullest external diameter D at the second end 6 of hollow body 2 such that locating section 20 is in effect indented relative to said fullest external diameter D. In some embodiments, external diameter D' of locating section 20 is approximately 0.4" (1.02 cm), whilst external diameter D of second end 6 of hollow body 2 is approximately 0.6" (1.52 cm).

The location section 20 may be particularly useful, if a user desires to create a hole in a first material through a fixing aperture in a second material in order to secure the second material to the first material. A user is able to easily seat guide device 100 in the fixing aperture of the second material using locating section 20 to facilitate drilling a hole in the first material. It is preferable for locating section 20 to seat tightly within the fixing aperture, to ensure a drill bit will be centered within the guide device. Consequently, a hole when created, will be centered within the fixing aperture of the second material.

Accordingly, in some embodiments, guide device 100 is suitable for use in a circular shaped fixing aperture which has a diameter of approximately 0.4" (1.02 cm) or greater.

Although, locating section 20 comprises a hollow cylindrical section with a cross sectional external diameter of approximately 0.4" (1.02 cm), it is easily understood that the shape and size including the cross sectional external diameter of locating section 20 can be adapted as desired by a person skilled in the art to enable the guide device seat within any shape or size fixing aperture.

In one example, the guide device could be used in conjunction with a fastening system comprising rails or track which are used to mount cladding materials to a substrate. Usually, with such fastening systems, the rail or tracks are provided with elongate fixing apertures to facilitate movement of the cladding materials due to environmental conditions when mounted to the substrate. Locating section 20 of guide device 100 can be configured to seat within the elongate fixing apertures such that the guide device 100 is centered within the elongate fixing aperture of the fastening system. The use of guide devices with materials having fixing apertures is described in greater detail with reference to FIGS. 7 and 8.

Referring now to FIGS. 4 to 6, guide device 200 includes a locating section 20 configured to seat within an elongate aperture 52 of the kind shown in profile 50 of FIG. 7. Guide device 200 comprises a hollow body 2 having a first end 4, a second end 6 and a continuous section 8 intermediate the first end 4 and the second end 6. Opening 2*a* extends from the first end 4 through the continuous section 8 to the second end 6. The hollow body 2 is generally defined by an inner wall 2*b* bounding the opening 2*a*, and an outer wall 2*c*. Guide device 200 extends approximately 1.5" (3.81 cm) from first side 4*a* of first end 4 to second side 6*a* of second end 6. In some embodiments, the guide device 200 may be longer or shorter than 1.5", for example between 0.5" and 3", between 1" and 2", etc., based on a length of a drill bit to be used with the guide device, a desired depth of a hole to be drilled in a substrate, a thickness of a substrate to be drilled, etc.

In this embodiment, guide device 200, comprises a substantially cylindrical shape at first end 4 and a substantially hexagonal shape at second end 6. The external cross-sectional diameter D of continuous section 8 proximal second end 6 increases in thickness until the shape of the hollow body changes from a circular shape to hexagonal shape. In some embodiments, the hexagonal shape extends approximately 0.62" (1.58 cm) from line 8*a* (shown in FIG. 4) to second side 6*a*. Similar to the guide device 100 depicted in FIGS. 1-3, cross sectional internal diameter d of opening 2*a* bound by inner wall 2*b* is constant from the first end 4 of hollow body 2 to the second end 6 of hollow body 2. In some embodiments, cross sectional internal diameter d is approximately 0.28" (0.71 cm), for example, based on an external diameter of a drill bit to be used with the guide device 200 and/or a diameter of a hole to be drilled in a substrate.

Locating section 20 of guide device 200 comprises an indent 22 on opposing sides 22*a* of the hexagonal shaped second end 6. In some embodiments, each indent 22 recesses opposing sides 22*a* of the hexagonal shaped second end 6 by approximately 0.068" (0.17 cm) such that the hexagonal shape of the indented locating section 20 is smaller with two longer sides than the hexagonal shape of second end 6.

Guide device 200 is further provided with a plurality of apertures 24 located spaced apart on hexagonal shaped second end 6, wherein apertures 24 are sized and shaped to facilitate ejection of dust and waste material from the guide device 200. Similar to the apertures 12, 14, 16 described with reference to FIGS. 1-3, the apertures 24 in guide device 200 permit the passage of dust and waste material such that at least a portion of the dust and waste material can leave the guide device 200 without having to be carried as far as the first end 4 within the opening 2*a* by the auger portion of the drill bit. In some embodiments an aperture 24 is located on each face 24*a* or some of the faces 24*a* of the hexagonal shaped second end 6. In some embodiments, each of apertures 24 is configured to occupy up to approximately 70% of the width of each face 24*a* of the hexagonal shaped second end. In further embodiments each of apertures 24 are approximately 0.18" (0.48 cm) in diameter. This ensures that dust build-up inside the guide device 100, which may cause the drill bit to slow down or become blocked whilst in use, is prevented or reduced.

In some aspects, the size of apertures 24 can be determined so as to facilitate the passage of dust or other debris out of the opening 2*a*. Because debris within the opening is being carried by an auger portion of a rotating drill bit, the debris may generally be moving along a spiral or helical path along the inner edge 2*b* bounding the opening 2*a*. When debris leaves the opening at an aperture 24, it can travel in a direction tangent to the circular profile of inner edge 2*b*, rather than radially outward. Accordingly, increasing the size of the apertures 24 may allow a greater portion of the debris to be propelled outward through the apertures 24.

Each of guide devices 100, 200, 300 are preferably formed from a suitable metal such as steel, in which the various features of each respective guide device 100, 200 are easily machined. In some aspects, guide devices 100, 200, 300 may be formed from other suitable hard metals, such as titanium. Preferably, the material of the guide devices 100, 200, 300 is resistant to degradation due to heat build-up from mild contact pressure during use. Moreover, the material is preferably ductile and rigid so as to resist input forces over a lifecycle including hundreds or thousands of uses.

In various embodiments, the guide devices described herein may be designed to be compatible for use with a particular profile or other structure to be mounted to a substrate, or to be compatible with an industry standard fixing aperture or other structure. For example, guide devices 200 and 300 are designed for use with a profile 50 comprising elongate hexagonal shaped fixing apertures 52 such as that shown in FIG. 7. Profile 50 is one example of a profile that forms part of a fastening system used to mount cladding materials to a substrate, in particular fiber cement cladding materials mounted to a structural substrate. Profile 50 is provided with hexagonal shaped elongate fixing apertures 52. Locating section 20 of guide device 200, 300 is configured to seat within the elongate fixing apertures 52 such that guide device 200, 300 is centered within the hexagonal shaped elongate fixing aperture 52 of profile 50.

Profile 50 may be one of a plurality of panel support profiles used to form a fastening system, whereby a first panel support profile 50 is inverted relative to the second panel support profile 50 such that the first and second panel support profile members seat together. The shape of the first panel support profile allows two first panel support profiles to interlock such that one of the two panel support profiles can be fixed to a building substrate and support and retain a cladding panel fixed to the other panel support profile. For example, one of the tracks can be affixed to the back side of a heavy paneled building product, such as a 4 ft.×8 ft. (121.9 cm×243.8 cm) cladding panel. The other one of the tracks can be affixed to a building frame. The fastening system can comprise more than one pair of the elongated tracks arranged in a spaced apart relationship between the cladding panel and the building frame. The tracks facilitate alignment of the cladding panel to the building frame and allow a large, heavy cladding panel to be easily and quickly attached to the building frame. The tracks are also designed to be self-locking in that the weight of the cladding panel automatically locks the track on the back side to the track on the building frame. Furthermore, the tracks are designed to be positioned in a manner such that they are concealed from view and do not detract from the aesthetics of the cladding panel.

In some embodiments, the profile 50 can be formed from extruded aluminum alloy or folded steel. It is to be understood, that any other suitable material or forming technique known to a person skilled in the art can also be used, for example, the material chosen to form a support profile 50 suitable for attaching a cladding panel to a structural substrate could also be formed from one or more of machined wood, fiberglass, plastic, hardened rubber, metal alloys, carbon fiber, or other similarly hardened woven composites. It is also understood that the forming technique used to form the profile 50 is selected in accordance with the material chosen to form the profile 50. Such suitable forming techniques include, for example, extrusion, mold casting, sheet folding or machining.

In the panel support profile 50 of FIG. 7, fixing apertures 52 are configured to seat a nut or fasteners comprising a polygon shape. In some instances, fixing aperture 52 comprises an elongate polygonic shape, wherein at least one pair of opposing sides of the polygonic shape are longer than the other sides of the polygonic shape to allow lateral movement of a fastener within the fixing aperture 52. In most instances, nuts or fasteners comprise a hexagonal shape, thus in this instance, the fixing aperture 52 comprises a hexagonal open ended channel or an elongate hexagonal open ended channel, however it is to be understood that any polygonic shaped aperture or elongate polygonic shaped aperture suitable to seat a nut or fastener can also be used. One of the advantages of using this shaped fixing aperture is that an end user is able to drill holes for the fasteners or fixing elements easily without needing to lift or move the first panel support profile member.

Figure 8:
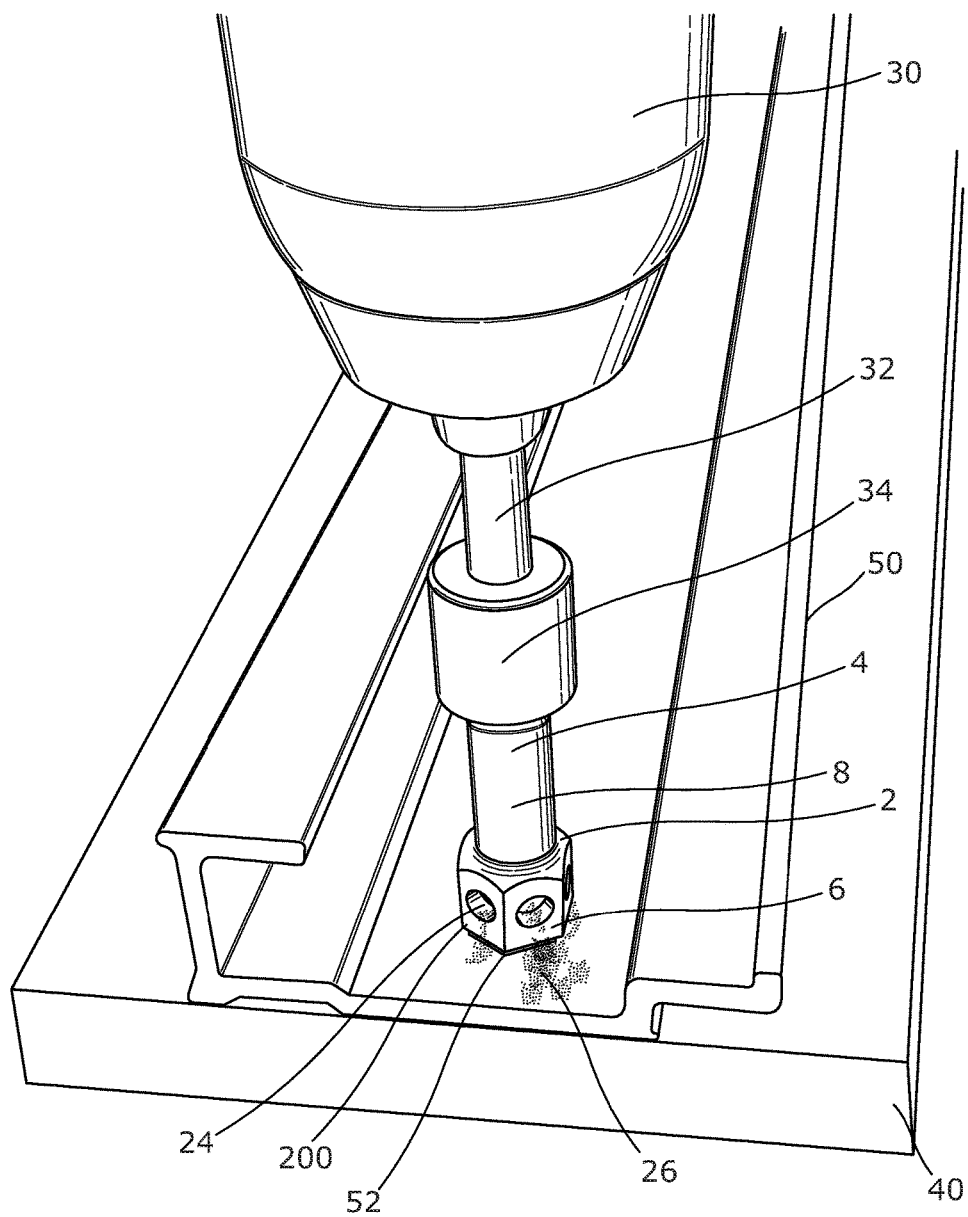
FIG. 8 shows a perspective view of the guide device of FIG. 4 in use with a drill and the exemplary profile of FIG. 7.

Referring now to FIG. 8, there is shown an example of guide device 200 together with a drill 30 in use. The guide device 200 and drill 30 are being used to create a hole in a substrate 40 through a hexagonal shaped elongate fixing aperture 52 of a profile 50, such as the profile 50 depicted in FIG. 7, such that a fastener may be accommodated within the hole to secure the profile 50 to the substrate 40. Substrate 40 may be a building substrate, such as a building framework, or may be an article to be mounted to a building substrate, such as an exterior cladding panel. Drill 30 is provided with a drill bit collar 34.

In use, drill bit 32 is positioned within the opening 2a (FIGS. 4-6) of the hollow body 2 such that the drill bit 32 extends through the hollow body 2 from the first end 4 to the second end 6, and is coaxially located with the hollow body 2 of the guide device 200 and orthogonally located relative to a material being drilled (e.g., the substrate 40). Guide device 200 allows drill bit 32 to freely rotate about the fixed rotational axis of the drill to create a hole, whilst preventing free lateral movement around the hole being drilled. In the perspective view of FIG. 8, the locating section 20 (FIGS. 4-6) is seated within and surrounded by the fixing aperture 52. The material of the support profile 50 surrounding the fixing aperture 52 maintains the guide device 200 in a fixed location while a hole is drilled in the substrate 40. In some aspects, an end of the locating section 20 (FIGS. 4-6) of the guide device 200 rests against the substrate 40 and/or the second end 6 (e.g., the indent 22 as shown in FIGS. 4-6) of the guide device rests against the surface of the support profile 50.

Initially, drill bit collar 34 sits above guide device 200, as the tip of the drill bit 32 rests on the surface of the substrate 40 and the length of the drill bit 32 beyond the drill bit collar 34 is greater than the length of the hollow body 2. As the hole is being drilled, the auger (not shown) of drill bit 32 lifts the detritus 26 up out of the hole being created towards apertures 24, where it is ejected from guide device 200. As the hole is drilled and the tip of the drill bit 32 extends into the substrate 40, drill bit collar 34 moves into contact with the first end 4 of guide device 200 when the drill bit 32 has created a hole of desired depth in substrate 40. When the drill bit collar 34 comes into contact with the first end 4 of the guide device 200, the drill bit 32 is prevented from penetrating deeper into the substrate 40. The contact between the drill bit collar 34 and the guide device 200 can indicate to a user drilling the hole that the hole is completed, and may prompt the user to remove the drill 30, drill bit 32, and/or the guide device 200 from the hole and continue to drill a second hole at another fixing aperture of the support profile 50. In some aspects, the contact between the drill bit collar 34 and the guide device 200 may further be advantageous by preventing a user from inadvertently drilling a hole deeper than desired, which may penetrate, puncture, mar, or otherwise disturb the other side of the substrate 40 (e.g., the visible exterior surface of a wall cladding panel or the like).

After a hole is drilled to the desired depth within the fixing aperture 52, a mechanical fastener can be inserted through the fixing aperture 52 of the support profile 50 and into the hole in the substrate 40 to fix the support profile 50 to the substrate 40. For example, suitable mechanical fasteners for fixing the support profile 50 to the substrate 40 through fixing aperture 52 may include short or long fiber cement screws, angled pro-twist screws, and/or undercut anchors with or without undercut holes.

Figure 9A:
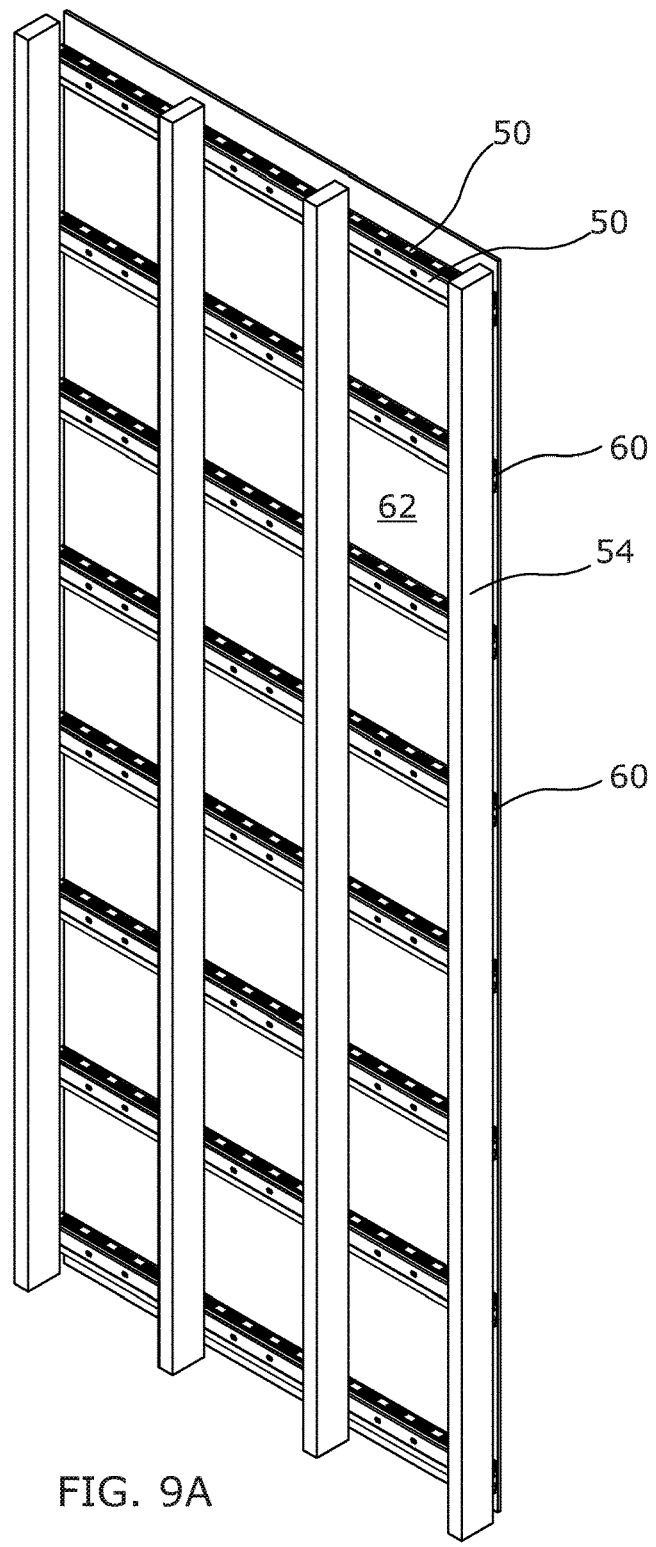
FIG. 9A is a perspective view of a rear face of a façade panel secured to a frame structure using the fastening system of FIG. 7.
Figure 10D:
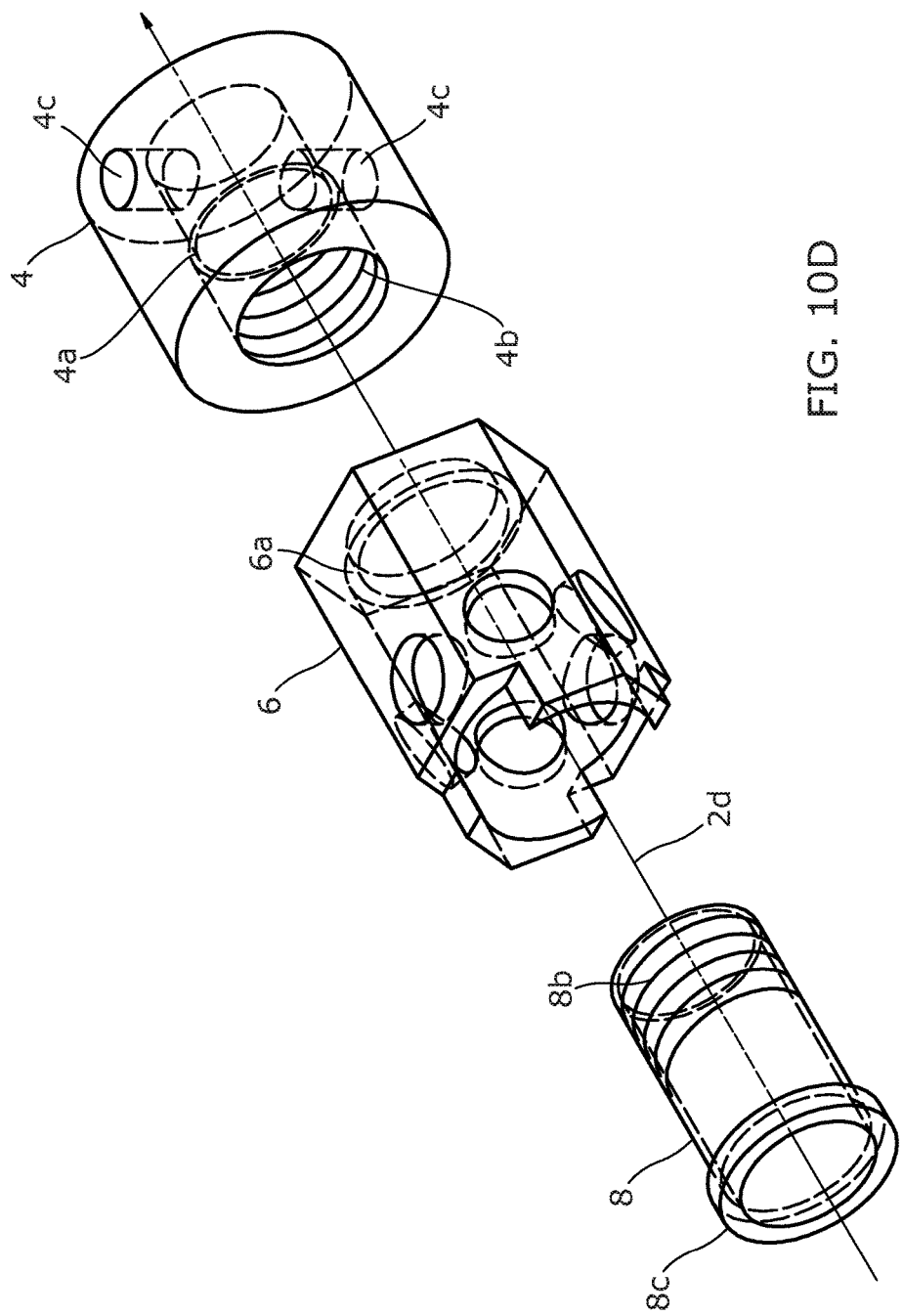
FIG. 10D shows an exploded perspective view of the embodiment of FIGS. 10A-10C.

Referring now to FIGS. 9A-9C, there is shown an example of a fastening system 60 which may be assembled using the guide devices 100, 200 disclosed herein. The fastening system 60 comprises two first panel support profile members, such as profiles 50 depicted in FIGS. 7 and 8. In the embodiment shown, two profiles 50 are seated together to form each row of the fastening system 60. For clarity, profiles 50 hereinafter are referred to as the first and second panel support profile member 50a and 50b. It is to be understood that references to the first panel support profile member 50a should where appropriate extend to the second panel support profile member 50b.

Referring specifically to FIGS. 9A and 9C, there is shown a cladding panel 62 attached to a structural substrate 54 using fastening system 60. Cladding panel 62 can comprise a building material comprising cementitious materials, gypsum, or other suitable inorganic building materials such as those containing cellulose, glass, steel or polymeric fibers. In the embodiment shown, cladding panel 62 comprises a fiber cement cladding panel comprising a front face 62a and a rear face 62b and an edge member 62c intermediate to and contiguous to the front face 62a and the rear face 62b. Structural substrate 54 typically comprises a building framework comprising timber or metal framing materials.

In the embodiment shown, a plurality of fastening systems 60 are used to attach cladding panel 62 to structural substrate 54. It is to be understood that the number of fastening systems and/or fastening configurations used to attach the cladding panel 62 to structural substrate 54 is variable and is dependent on both the size and shape of the cladding panel 62 and the desired wind load levels that the end user wishes to achieve.

For example, in the embodiment shown, a 4 ft.×8 ft. (121.9 cm×243.8 cm) cladding panel 62 having a thickness of 7/16" (1.1 cm) required 8 fastening systems to attach the cladding panel to the structural substrate and to achieve a minimum design loading of 54.6 psf. In this example, each fastening system was attached to the panel and the structural substrate using fasteners wherein the fasteners were spaced apart from each other by 12" (30.5 cm). The first fastener used to attach the first panel support profile member 50a to the rear face of the cladding panel 62b was placed at 6" (15.2 cm) from edge member 62c. The fasteners used were undercut anchors.

Referring specifically to FIG. 9C, there is shown an enlarged side view of one fastening system 60 of FIG. 9B, wherein a cladding panel 62 is attached to structural substrate 54 using fastening systems 60.

First panel support profile member 50a comprising a first arm 53, a second arm 55 and a bridging portion 57 intermediate the first and second arm 53, 55 is attached to the rear face 62b of the cladding panel 62 using fasteners via fixing apertures 52. Similarly second panel support profile member 50b, also comprising a first arm 53, a second arm 55 and a bridging portion 57 intermediate the first and second arm 53, 55 is attached to the structural substrate 54 using fasteners via fixing apertures 52. The fasteners may be inserted through fixing apertures 52 into pre-drilled holes in the cladding panel 62 and the structural substrate 54. Pre-drilling may be accomplished using any of the guide devices 100, 200 depicted and described with reference to FIGS. 1-6 and 8.

First panel support profile member 50a is inverted relative to the second panel support profile member 50b such that the first and second panel support profile members 50a and 50b seat together. Second arm 55 seats within the 'u' shaped receiving channel defined by bridging portion 57, first arm 53 and projecting member 53a such that first arm 53 of the first panel support profile member 50a is seated adjacent to the second arm 55 of the second panel support profile member 50b and vice versa. Projecting member 53a of the first arm 53 is retained by the recess defined by side section 57 and second arm 55. The weight of cladding panel 62 forces first and second panel support profile members 50a and 50b into position thereby attaching cladding panel 62 to structural substrate 54.

In practice, an end user firstly attaches the first and second panel support profile members 50a and 50b to each of the cladding panel 62 and the structural substrate 54 separately using the methods described above with reference to FIGS. 1-8, and then the first panel support profile member 50a and second panel support profile members 50b are secured together. The end user can use any suitable means to secure the first and second panel support profile members 50a, 50b together, as the shape of the first and second panel support profile members 50a, 50b allows the first and second panel support profile members 50a, 50b to interlock.

For example, the end user could hang the first and second panel support profile members 50a, 50b together whereby first panel support profile member 50a is moved into a position where it is raised out of alignment with second panel support profile member 50b such that second arm 55 of first panel support profile member 50a are positioned above the 'u'-shaped receiving channel defined by bridging portion 57, first arm 53 and projecting member 53a of the second panel support profile members 50b. Projecting member 53a of first panel support profile member 50a is also positioned above the recess defined by side section 57 and second arm 55 of the second panel support profile members 50b. The first panel support profile member 50a is then moved into alignment with second panel support profile member 50b such that second arm 5 of first panel support profile member 50a is seated within the 'u'-shaped receiving channel defined by bridging portion 57, first arm 53 and projecting member 53a of the second panel support profile members 50b; and projecting member 53a of first panel support profile member 50a is seated within the recess defined by side section 57b and second arm 55 of the second panel support profile members 50b.

Alternatively, the first and second panel support profile members 50a, 50b are slid into position whereby second arm 55 of first panel support profile member 50a is seated within the 'u'-shaped receiving channel defined by bridging portion 57, first arm 53 and projecting member 53a of the second panel support profile members 50b; and projecting member 53a of first panel support profile member 50a is seated within the recess defined by side section 57b and second arm 55 of the second panel support profile members 50b.

In either method, the weight of the cladding panel forces first and second panel support profile members 50a, 50b into the interlocking position. The advantage of the present invention is that is provides a fastening system that is quick and easy to install for the end user.

FIGS. 10A-10D depict a further embodiment of a guide device 300. Similar to the guide devices 100, 200 described above, the guide device 300 includes a hollow body 2 having a first end 4, a second end 6, and a continuous section 8 intermediate the first end 4 and the second end 6. Similar to the guide device 200, the second end 6 of the guide device 300 has a generally hexagonal cross-sectional profile, including a plurality of apertures 24 distributed radially about the second end 6 on faces 24*a* of the hexagonal second end 6. A locating section 20 similarly comprises an indent 22 on sides 22*a* of the second end 6, such that the second end 6 can be seated securely within the fixing apertures 52 of the profile 50 depicted in FIGS. 7 and 8.

The first end 4, second end 6, and continuous section 8 of the guide device 300 may be attachable and detachable sections. As shown in the exploded view of FIG. 10D, the continuous section 8 may be inserted through the second end 6 and into the first end 4 along a longitudinal axis 2*d* to form the assembled guide device 300. The first end 4 includes an internal stop 4*a* and internal threading 4*b* within its interior opening. The second end 6 has an internal opening that narrows at interior wall 6*a*. The continuous section 8 includes a collar 8*c* and external threading 8*b* compatible with the internal threading 4*b* of the first end 4. Thus, when the continuous section 8 is inserted through the second end 6, the collar 8*c* is restricted from traveling beyond the interior wall 6*a* of the second end 6. The continuous section 8 and the first end 4 can be coupled together by engaging the external threading 8*b* and the internal threading 4*b* such that the continuous section 8 is rigidly secured to the first end 4. The internal stop 4*a* can block the continuous section 8 from traveling beyond a desired distance into the first end 4. For example, the internal stop 4*a* may be located at a distance of between 0.125" and 0.25" from the continuous section receiving end of the first end 4. In some embodiments, the threaded portion of the continuous section 8 may be as long as or slightly longer than the length of the internal threaded portion of the first end 4. For example, if the first end 4 contains a threaded section 0.25" long adjacent to the internal stop 4*a*, the continuous section 8 may have external threading 8*b* along approximately 0.25" to 0.3" of its exterior surface.

When assembled, certain components of the guide device 300 may be movable. In the example configuration of guide device 300, the first end 4 and the continuous section 8 may be rigidly attached, while the second end 6 may be able to rotate freely about the longitudinal axis 2*d*. The second end 6 may further be able to slide freely along the longitudinal axis 2*d* between the collar 8*c* and the body of the first end 4. Drill bit securing apertures 4*c* are provided in the first end 4 such that the first end 4 may be secured to a drill bit disposed at least partially within the guide device 300 along the longitudinal axis 2*d*. For example, the drill bit securing apertures 4*c* may have internal threading such that the drill bit may be secured by set screws or any other mechanical fixing means inserted through the drill bit securing apertures 4*c*. Thus, in use, the second end 6 may remain in a fixed position and orientation (e.g., with the locating section 20 inserted into a fixing aperture 52 of a profile 50), while the first end 4 and continuous section 8 rotate along with the drill bit as a hole is drilled.

In some embodiments, the fixing of a portion of the guide device 300 to the drill bit itself may be advantageous by providing for precise depth control and eliminating any requirement to use a separately attached drill bit collar on a drill bit being used to drill holes in a substrate. The securing location of the first end 4 along a drill bit can be determined such that, when the second end 6 is abutting the first end 4, the drill bit extends beyond the second end 6 by a distance equal to the depth of the hole to be drilled. With the first end 4 secured to the drill bit in this position, the drill bit may be prevented from drilling a hole deeper than the desired depth into the substrate. Accordingly, the guide device 300 may provide precise depth control by incorporating the functionality of a drill bit collar.

It will of course be understood that the invention is not limited to the specific details described herein, which are given by way of example only, and that various modifications and alterations are possible within the scope of the disclosure as defined in the appended claims.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Although making and using various embodiments are discussed in detail below, it should be appreciated that the description provides many inventive concepts that may be embodied in a wide variety of contexts. The specific aspects and embodiments discussed herein are merely illustrative of ways to make and use the systems and methods disclosed herein and do not limit the scope of the disclosure. The systems and methods described herein may be used in conjunction with fastening building panel support profiles to substrates, and are described herein with reference to this application. However, it will be appreciated that the disclosure is not limited to this particular field of use.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A guide device comprising:
    a first end section comprising:
        an exterior surface;
        an interior surface defining an opening extending through the first end section along a central axis, the opening being sized and shaped to receive a drill bit therethrough; and
        a drill bit securing aperture extending between the interior surface and the exterior surface perpendicular to the central axis, the drill bit securing aperture being sized and shaped to receive a mechanical fastener for securing the first end section to the drill bit;
    a second end section comprising a hollow body having an opening extending therethrough along the central axis, the opening being sized and shaped to receive the drill bit therethrough, the second end further comprising a plurality of apertures extending perpendicular to the central axis, the plurality of apertures distributed radially about the second end section to accommodate the passage of debris therethrough; and
    an intermediate section comprising:
        a hollow body having a first outer diameter, wherein a first end of the hollow body comprises external screw threading; and
        a collar section disposed at a second end of the hollow body opposite the first end, the collar section having a second outer diameter larger than the first outer diameter;
    wherein the second end section is slidably and rotatably coupled to the first end section such that the second end section can remain stationary relative to a substrate being drilled while the first end section is rotated by a rotating drill bit secured thereto; and
    wherein at least a portion of the interior surface of the first end section of the guide device comprises internal screw threading, such that the second end section is rotatably and slidably securable to the first end section by inserting the intermediate section through the opening of the second end and engaging the external screw threading with the internal screw threading.

2. The guide device of claim 1, wherein the second end section further comprises a locating section disposed at an end of the second end section distal from the first end section, the locating section sized and shaped to fit within a fixing aperture of an object to be secured to a substrate.

3. The guide device of claim 1, wherein the guide device controls a maximum depth of a hole being drilled in the substrate by the drill bit by preventing the drill from further penetrating the substrate when the second end section slides to a position abutting the first end section.

4. A guide device comprising:
    a hollow body having a first end, a second end, and a continuous section intermediate the first end and the second end, wherein the second end is configured to removably couple with a fixing aperture of a mountable structure, the second end comprising a locating section having a hexagonal cross-sectional profile sized and shaped to be inserted into the fixing aperture;
    an opening extending along a central axis from the first end through the continuous section to the second end, the opening configured to receive a drill bit therethrough; and
    at least one aperture located on the hollow body intermediate the first and second end of the hollow body, the aperture being contiguous with the opening and extending perpendicular to the central axis to accommodate the passage of debris therethrough.

5. The guide device of claim 4, wherein the opening has a circular cross section having a constant diameter from the first end to the second end.

6. The guide device of claim 5, wherein the diameter of the circular cross section is greater than an external diameter of the drill bit.

7. The guide device of claim 6, wherein the diameter of the circular cross section is greater than the external diameter of the drill bit by a length between 0.005" and 0.02".

8. The guide device of claim 4, wherein the hollow body of the guide device has a length along the central axis, the length being determined such that the first end of the guide device comes into contact with a structure of a drill driving the drill bit when the drill bit extends a preselected distance beyond the second end of the guide device.

9. The guide device of claim 4, wherein the locating section has a cross-sectional area smaller than a cross-sectional area of a portion of the hollow body intermediate the locating section and the first end.

10. The guide device of claim 4, wherein the hollow body comprises a plurality of apertures disposed radially about the hollow body, the apertures being contiguous with the opening.

11. The guide device of claim 10, wherein the apertures are circular apertures having a diameter between approximately 0.08" and 0.18".

12. The guide device of claim 10, wherein the apertures are sized and shaped to form a flow path for debris transported by the drill bit to pass from the opening out of the guide device without traveling to the first end.

13. The guide device of claim 10, wherein the apertures comprise between 45% and 55% of the area of the second end of the hollow body.

* * * * *